(12) United States Patent
Blanding

(10) Patent No.: US 6,316,724 B1
(45) Date of Patent: Nov. 13, 2001

(54) UTILITY LINE SPACER AND METHOD FOR MANUFACTURING SAME

(75) Inventor: Douglas Blanding, Bridgeport, NY (US)

(73) Assignee: New Line Concepts, LLC, Bridgeport, NY (US)

( * ) Notice: Subject to any disclaimer, the term of this patent is extended or adjusted under 35 U.S.C. 154(b) by 0 days.

(21) Appl. No.: 09/557,576

(22) Filed: Apr. 21, 2000

(51) Int. Cl.[7] .................................................. H02G 7/00
(52) U.S. Cl. ..................... 174/40 R; 174/44; 174/146; 174/154
(58) Field of Search ..................... 174/40 R, 44, 174/138 E, 138 G, 146, 148, 154, 167

(56) References Cited

U.S. PATENT DOCUMENTS

| | | | |
|---|---|---|---|
| 2,831,915 | 4/1958 | Prowant | 174/158 |
| 3,055,623 | 9/1962 | Becker | 248/61 |
| 3,254,151 | 5/1966 | Myers | 174/40 |
| 3,383,739 | 5/1968 | Pitzel | 24/132 |
| 3,456,066 | 7/1969 | Petze, Jr. | 174/146 |
| 3,585,277 * | 6/1971 | Lewis | 174/146 |
| 3,867,566 * | 2/1975 | Lewis | 174/146 |
| 3,906,143 * | 9/1975 | Leblanc | 174/42 |
| 3,922,481 * | 11/1975 | Lewis | 174/146 |
| 3,924,055 * | 12/1975 | Moore et al. | 174/40 R |
| 3,925,595 | 12/1975 | Hawkins | 174/42 |
| 3,939,300 | 2/1976 | Hawkins | 174/42 |
| 4,020,277 | 4/1977 | LaChance, Sr. et al. | 174/146 |
| 4,423,285 | 12/1983 | Thuillier et al. | 174/146 |
| 4,471,156 * | 9/1984 | Hawkins | 174/42 |
| 4,480,149 | 10/1984 | Hawkins | 174/42 |
| 4,533,785 | 8/1985 | Riganti | 174/42 |
| 5,021,612 | 6/1991 | Joffe | 174/146 |
| 5,371,320 | 12/1994 | Torok et al. | 174/42 |
| 5,801,336 | 9/1998 | Blanding | 174/146 |

* cited by examiner

Primary Examiner—Dean A. Reichard
Assistant Examiner—W. David Walkenhorst
(74) Attorney, Agent, or Firm—George R. McGuire; Hancock & Estabrook, LLP

(57) ABSTRACT

A spacer device for maintaining separation of a plurality of utility lines. The spacer includes a series of non-conductive, insulator members extending in longitudinally spaced relation to one another along a common longitudinal axis, and being interconnected to one another by an elongated rod which also extends along the common longitudinal axis. The insulator members each include respective conductor engaging portions, body portions, and a passageway extending longitudinally therethrough. The rod engages and extends through the passageways of each insulator member. The conductor engaging portions each include bar members that have a v-shaped notch removed therefrom to facilitate stable and secure engagement of the insulator members on top the conductors.

13 Claims, 7 Drawing Sheets

UTILITY LINE SPACER AND METHOD FOR MANUFACTURING SAME

BACKGROUND OF THE INVENTION

1. Field of the Invention

The present invention relates generally to apparatus for maintaining separation of suspended electrical conductors arranged in a three phase "straight line" system, and also to such devices that are non-conductive in nature.

2. Description of Prior Art

A common overhead electric distribution system generally operates in one of two ways, either in an arrangement known as a "grounded wye system," or in a "delta system." In both systems, three primary conductors operate at voltages 120 degrees out of phase with one another (commonly referred to as a "3-phase system"), with the voltage traveling out from a source (typically a "sub-station") through the primary conductors, and then returning to the source. In the grounded wye system, the voltage returns to the source through a neutral (grounded) conductor, while in the delta system, the voltage returns through one of the primary conductors.

When a conductor makes contact with a primary conductor of a different phase voltage there is a difference in potential thereby causing a fault. Environmental and/or site conditions such as high winds, ice, falling tree limbs, and distortion of utility pole sets cause conductors to come into contact with one another, thus creating faults in the system. Most electric distribution systems do take precautionary measures by employing over current protective devices such as sub-station breakers, sectionalizers and fused disconnects in order to prevent major damage to the system and minimize the effects of a potentially dangerous situation. Even with the aid of these types of devices, however, the system down time due to the fault is very costly to the utility company and very inconvenient for the people whose power is off until the fault is corrected.

Quite often 3-phase systems are arranged with the conductors in a triangular configuration. The present inventor's U.S. Pat. No. 5,801,336, and the prior art cited therein, disclose spacer apparatus used for maintaining separation of the conductor in a triangular configuration. On occasion, however, the system is arranged with the conductors extending at least partially in a common horizontal plane, in most instances, about 42 inches separating each conductor.

3. Objects and Advantages

It is therefore a principal object and advantage of the present invention to provide a spacer that is useful in maintaining separation of electrical conductors positioned in a common horizontal plane.

It is another object and advantage to provide a spacer that is non-conductive.

It is a further object and advantage of the present invention to provide a spacer that is easily and relatively inexpensively to manufacture.

Other objects and advantages of the present invention will in part be obvious, and in part appear hereinafter.

SUMMARY OF THE INVENTION

In accordance with the foregoing objects and advantages, the present invention provides a spacer apparatus generally comprised of three insulators maintained in fixed, spaced relation to one another by a rigid or semi-rigid rod. Each of the insulators are essentially identical in construction, with each including a longitudinally elongated body having a series of skirts longitudinally spaced at predetermined intervals therealong, a central passageway extending longitudinally therethrough, and a conductor retaining portion at one end thereof. A rod, preferably made of fiberglass, is securely attached to, and extends through the opening formed through each of the insulators, thereby maintaining each in fixed, spaced relation to one another.

The conductor retaining portion of the insulators is comprised of three extension bars positioned in parallel, laterally spaced relation to one another and extending along axes that are parallel to, or co-incident with the insulator's longitudinal axis. An anchoring rod extends through each of the extension bars in a position spaced from the end face of the insulator to which it is nearest, thereby creating two, laterally spread apart openings defined by two successively positioned extension bars and the anchoring member. The bottom surfaces of the extension bars include a V-shaped groove cut out therefrom which are intended to engage the top of a conductor, thereby providing a stable resting position for the insulators atop the conductors.

It is intended that the spacer be installed on the conductors at about a mid-span position between adjacent poles, or at any other interval between adjacent poles deemed appropriate. The spacer is installed by a lineman initially placing the unit on top of the conductors such that each conductor is in contacting relation with a portion of the V-shaped groove formed in a conductor retaining portion of an insulator. A tie, preferably a UV resistant, plastic tie, is then wrapped around the underside of the conductor, around the portion of the upper and sides of the anchoring member positioned between successive ones of the extension bars, and through the openings formed between the bars. The ties may then be fastened in any conventional manner, thereby securely retaining the conductor in connected relation to the insulator.

The spacer may be manufactured by inserting a rod, preferably a fiberglass rod, longitudinally through three molds formed in the shape of the insulators. The insulator material, preferably a high density polyethylene, is then injected at a predetermined pressure into the molds. The pressure hardens the material around the rod nearly instantaneously and the molds are then removed. The insulators could also be molded individually, as opposed to simultaneously, around the rod. In addition, the insulators could be molded prior to insertion of a rod therethrough (it would be necessary that such a mold include a cavity to define the opening through which the rod extends).

BRIEF DESCRIPTION OF THE DRAWINGS

The present invention will be more fully understood by reading the following Detailed Description in conjunction with the accompanying drawings wherein.

DETAILED DESCRIPTION OF THE INVENTION

Figure 1:
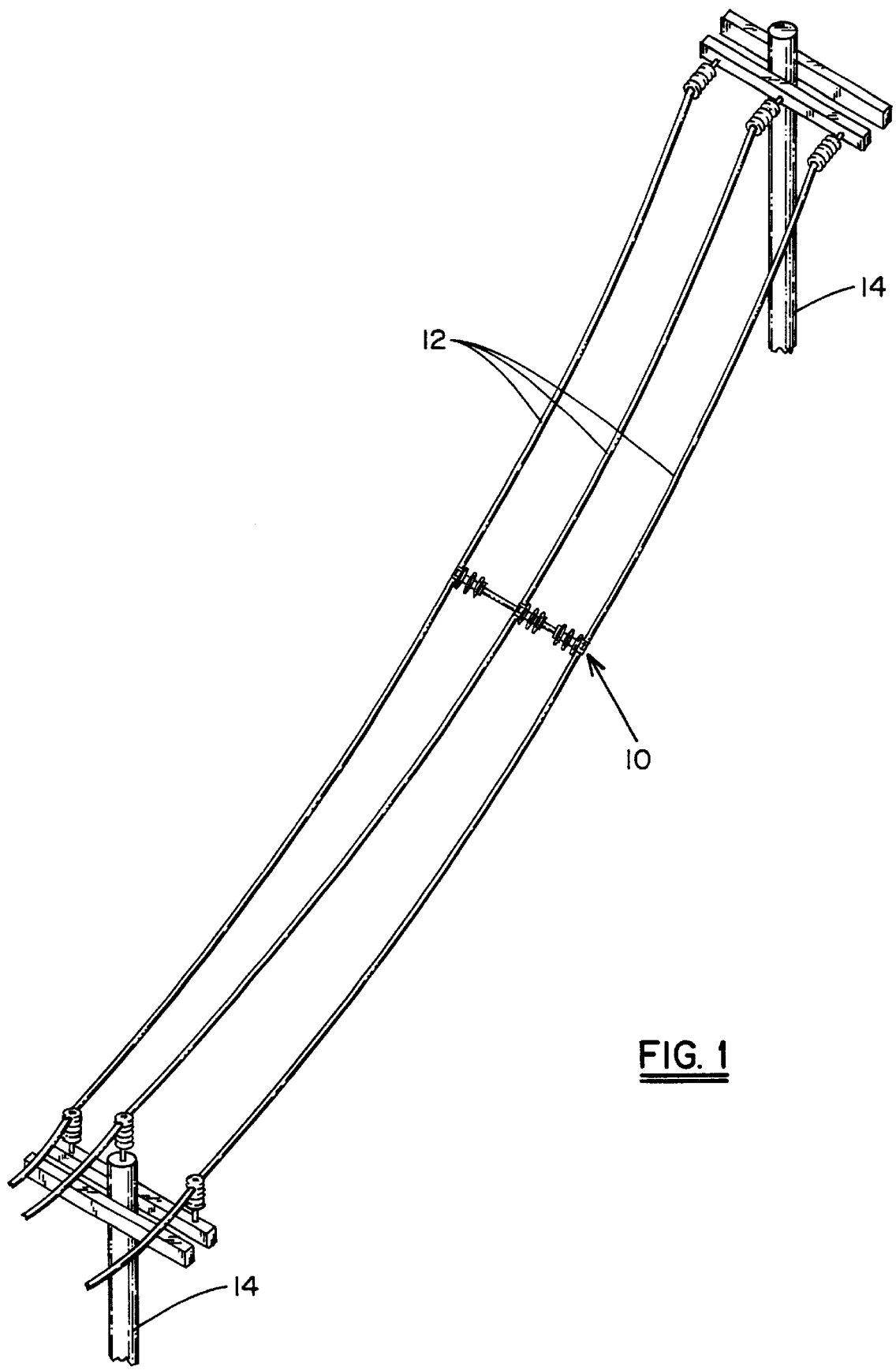
FIG. 1 is a perspective view illustrating the present invention in use on a utility line.

Referring now to the drawings, wherein like reference numerals refer to like parts throughout, there is seen in FIG.

1 a spacer, designated generally by reference numeral 10, engaged with and disposed above a series of electrical conductors 12. Conductors 12 are illustrated as standard overhead electric lines which are strung between successively positioned utility poles 14, and which extend, at least partially, in a common horizontal plane. Spacer 10 is illustrated as being mounted on conductors 12 at about their mid-span position, but it should be understood that spacers 10 can be mounted on conductors 12 at any position along their length deemed appropriate for the given conditions. Due to this preferred application of spacer 10, terms such as "top" and "bottom" as used herein refer to the relative positioning of spacer 10 and conductors 12.

Figure 2:
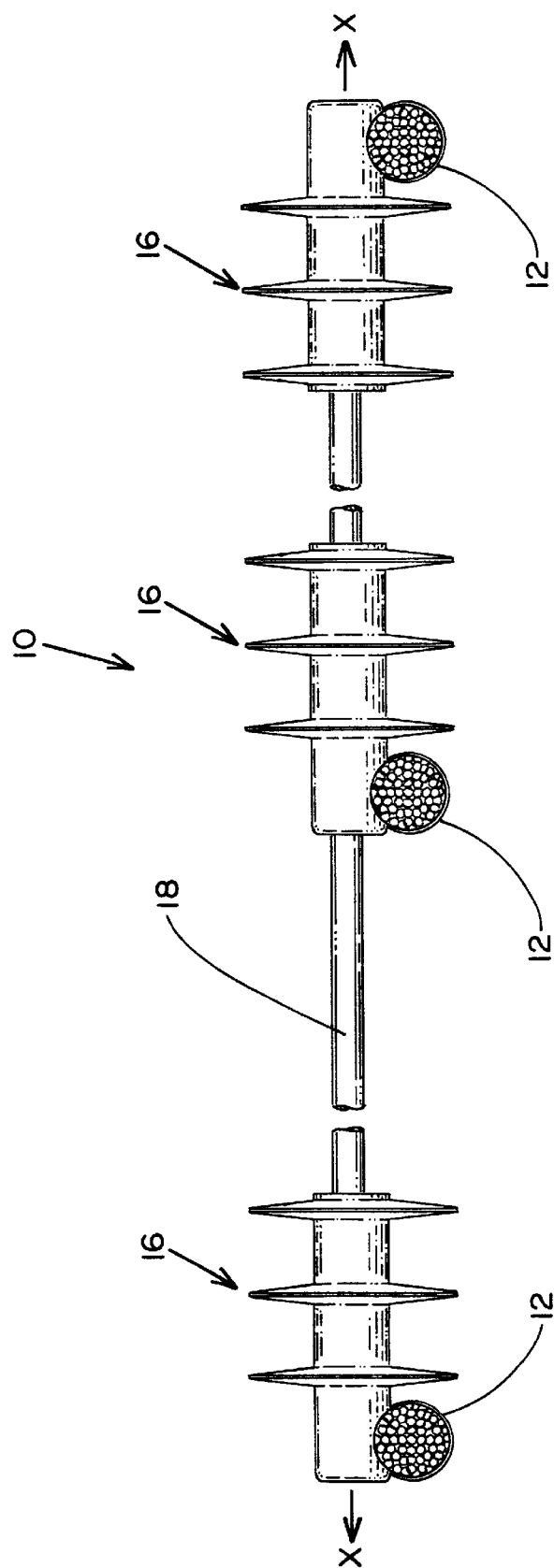
FIG. 2 is a perspective view of the present invention.

Referring more specifically to FIG. 2, in its preferred mode, spacer 10 is seen to be comprised of three, essentially identical insulators, denoted generally be reference numeral 16, maintained in longitudinally spaced relation to one another by a rod 18 which extends along a longitudinal axis X-X. The spacing of insulators 16 and the length of rod 18 are determined by the spacing of the conductors on which they are to be mounted, but standard utility lines, such as those illustrated in FIG. 1, are generally spaced at about 42 inches apart. Accordingly, rod 18 would preferably be 84 inches long with two insulators 16 being positioned at its opposite ends and one insulator 16 being positioned at its mid-point, about 42 inches from the other two insulators. It should be understood, that spacer 10 could be comprised of only two insulators, or any other number of insulators, depending upon the number of lines it is intended on maintaining in separated relation to one another.

Figure 6:
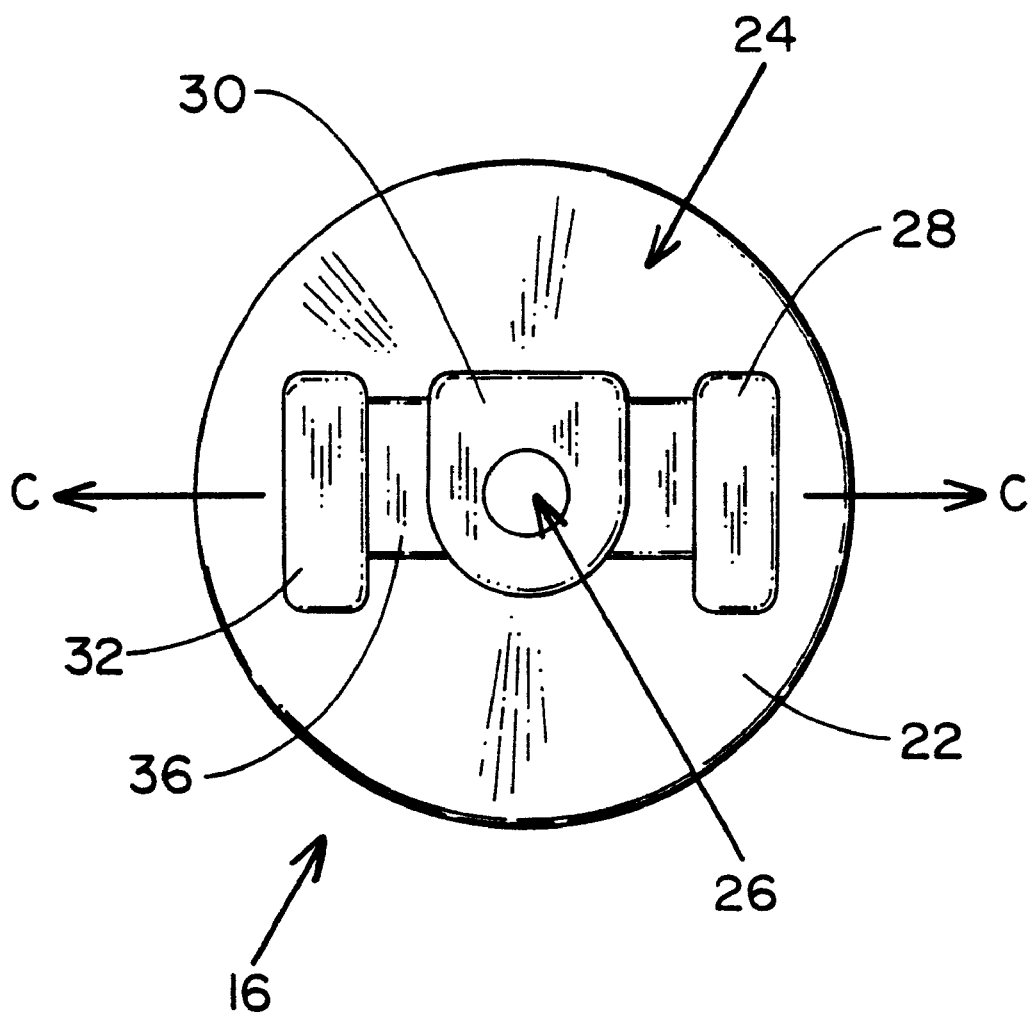
FIG. 6 is a left side elevational view thereof.
Figure 7:
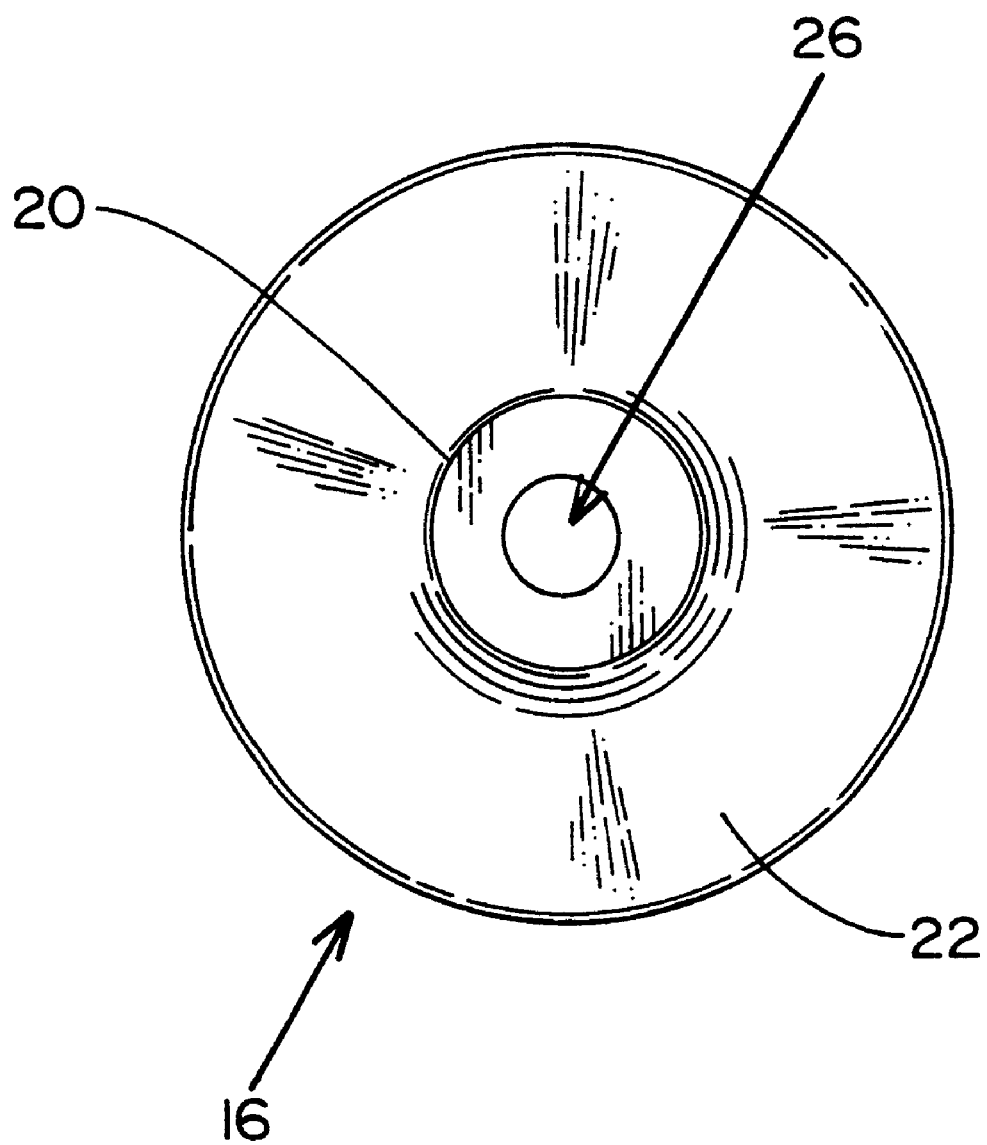
FIG. 7 is a right side elevational view thereof.

With reference to FIGS. 3–7 each of the insulators 16 is comprised of a body portion 20 having a series of skirts 22 extending radially outwardly therefrom at longitudinally spaced intervals along the length thereof, and a conductor engaging portion, designated generally by reference numeral 24, extending from the outwardly facing surface 25 of one end of body 20. As seen in FIGS. 6 and 7, spacer 10 further includes an open passageway 26 formed centrally therethrough along longitudinal axis X-X and through which rod 18 extends.

Insulator 16 is preferably composed of a high density polyethylene, although other non-conductive materials could be substituted therefor. In furthering the non-conductive quality of spacer 10, rod 18 is preferably composed of fiberglass, although other rigid or semi-rigid, non-conductive materials could be substituted therefor. The fiberglass composition of rod 18 is rigid enough to maintain separation of conductors 12, while being flexible enough to absorb motion in conductors 12 caused by external forces, such as wind. Thus, spacer 10 is preferably a wholly non-conductive, non-metallic composition which prohibits any static discharge between it and the conductors 12.

Figure 3:
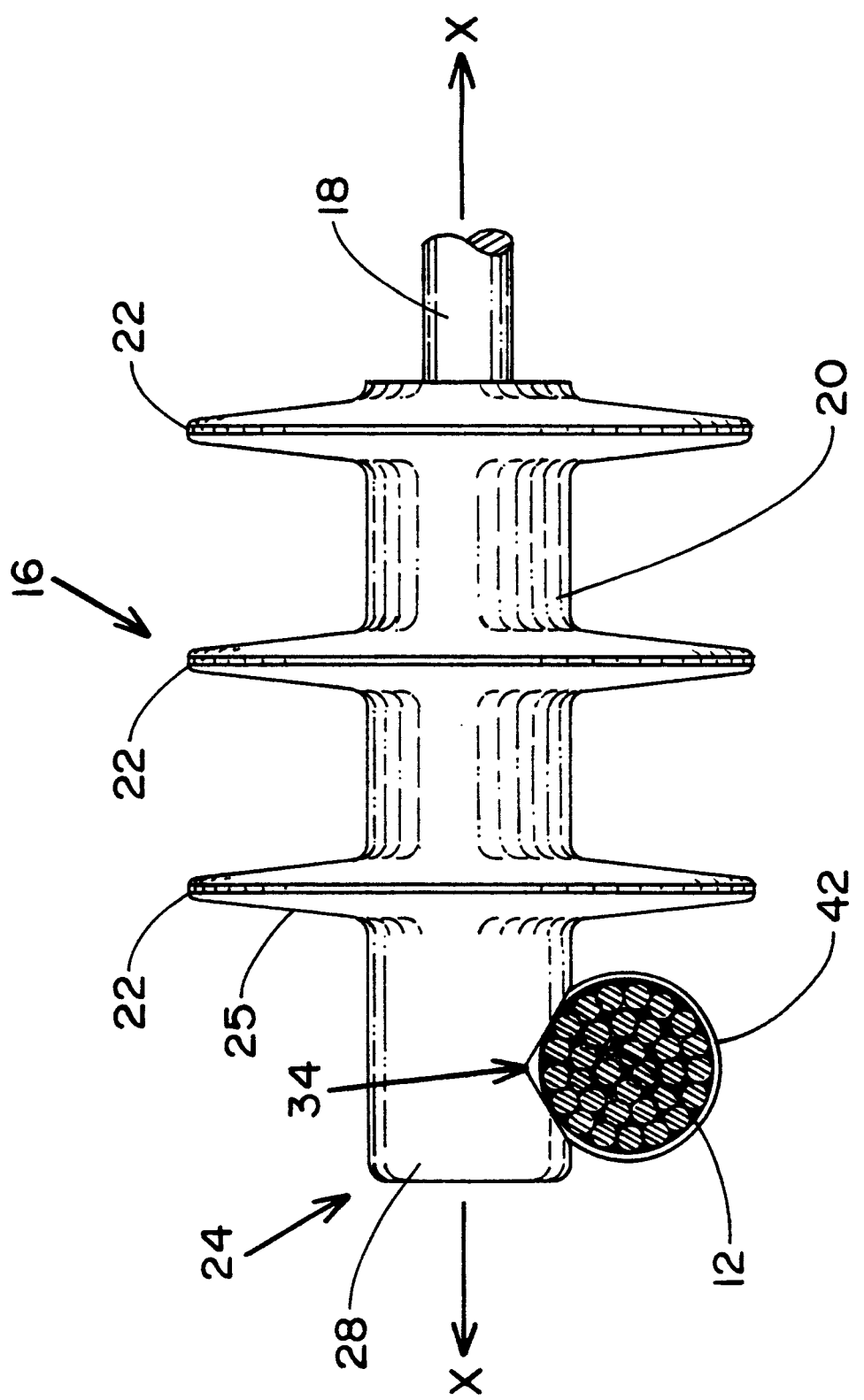
FIG. 3 is a front elevational view of the insulator member of the present invention.
Figure 4:
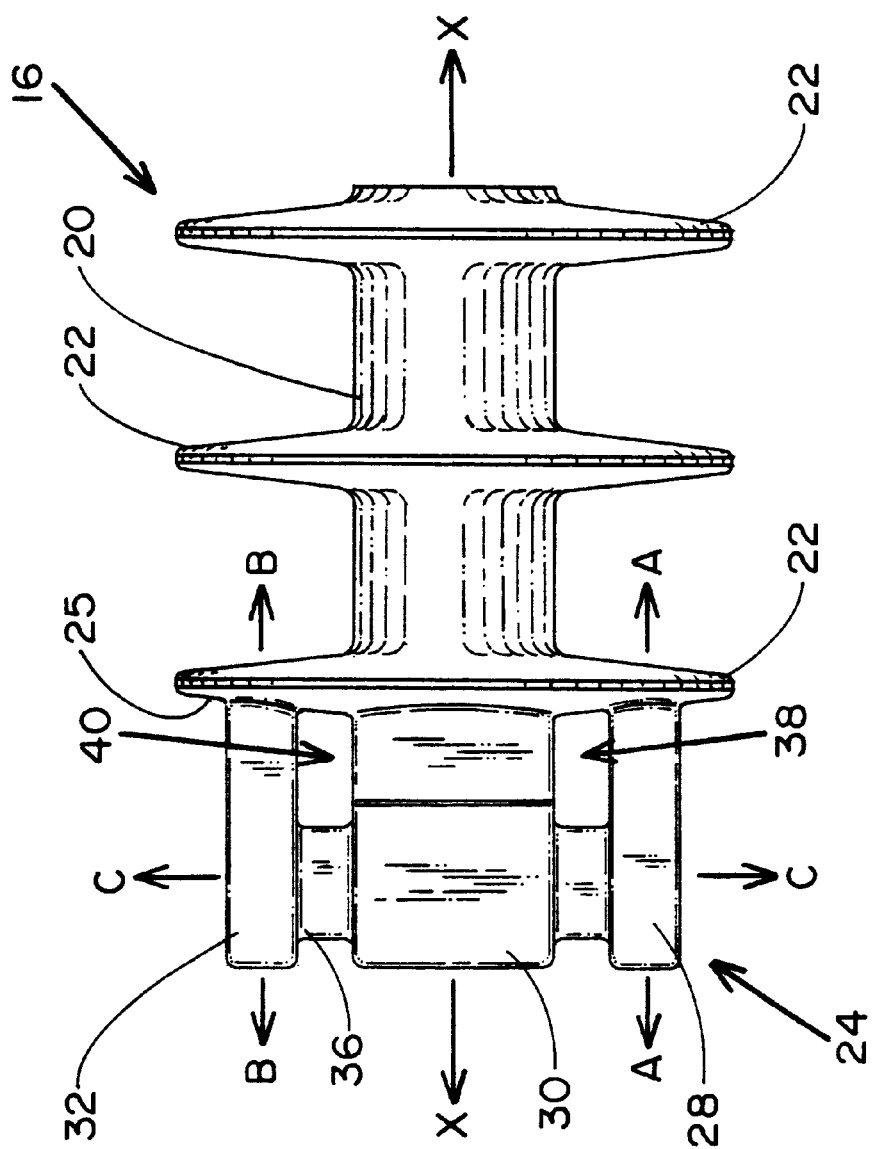
FIG. 4 is a top plan view thereof.
Figure 5:
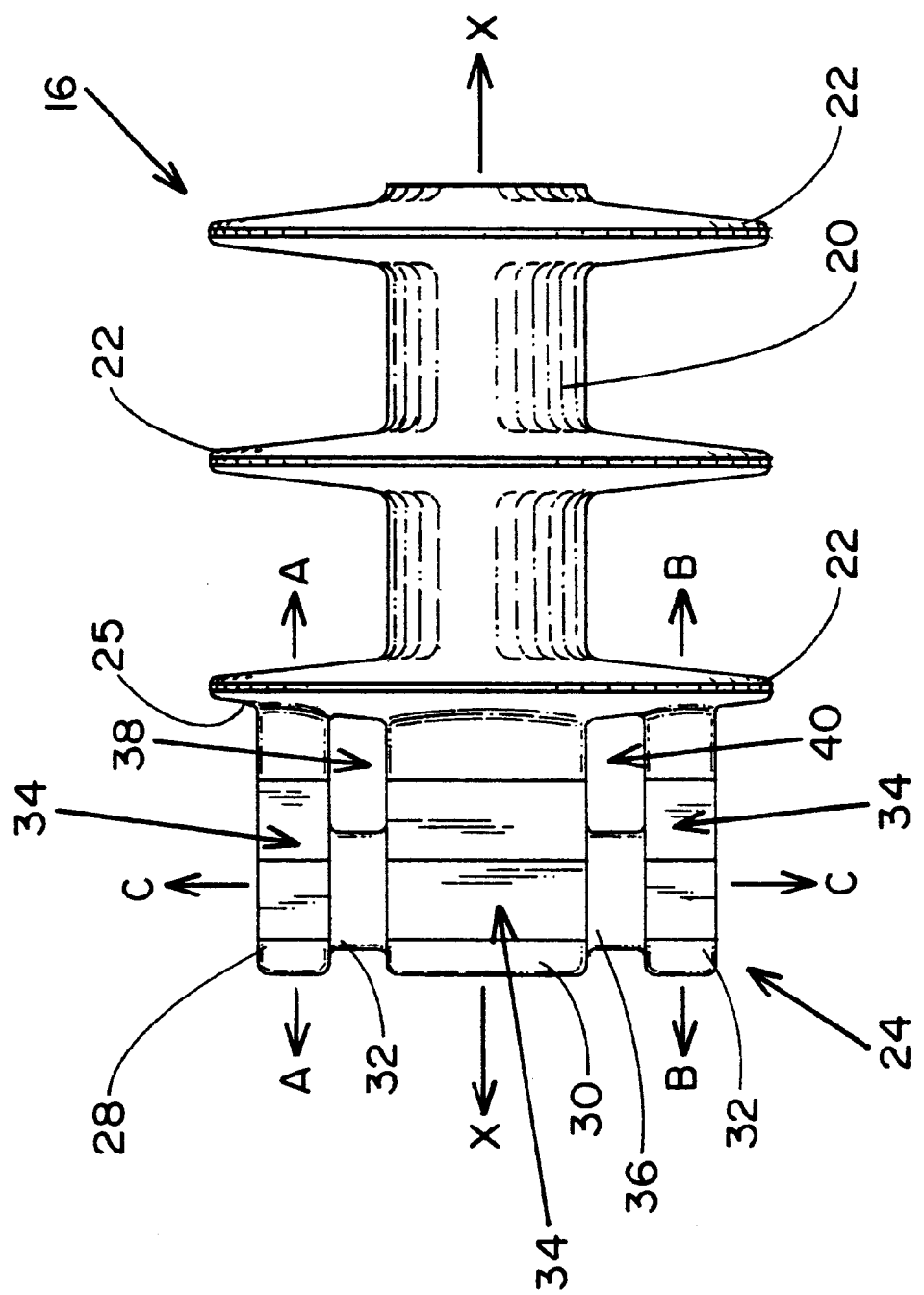
FIG. 5 is a bottom plan view thereof.

With reference to FIGS. 3–6, conductor engaging portion 24 is comprised of three bars 28, 30 and 32 which extend along longitudinal axes A-A, X-X (co-incident with the longitudinal axis of spacer 10), and B-B, respectively, which are laterally spaced and parallel relative to one another. The bottom surfaces of bars 28, 30 and 32 include a V-shaped groove 34 cut out therefrom, as best seen in FIG. 3. Groove 34 provides a stable geometry for permitting spacers 10 to securely rest upon conductors 12, as will be described in greater detail hereinafter.

Conductor engaging portion 24 further includes an anchor bar 36 extending along a longitudinal axis C-C, transverse to axes A-A, B-B and X-X. Anchor bar 36 is fixedly secured to bars 28, 30 and 32, and is laterally spaced from outwardly facing surface 25, thereby forming two openings 38 (defined by bars 28, 30, 36 and surface 25) and 40 (defined by bars 30, 32, 36 and surface 25) (see FIGS. 4 and 5). Openings 38 and 40 facilitate secure anchoring of conductors 12, as will be explained in greater detail hereinafter.

To mount spacer 10 on a series of conductors 12, a line person will initially place conductor engaging portions 24 of insulators 16 on conductors 12 with a portion of V-shaped grooves 34 engaging the conductor. Once each of the insulators 16 is situated atop a respective conductor 12, the line person will then use a fastener 42, such as a plastic tie or conventional conductor tie wire, to wrap around the underside of conductor 12, over anchor bar 36 and through opening 38 (or 40). Fastener 42 is then tied off to secure the relative positioning of spacer 10 to conductors 12 (see FIG. 3). A second fastener 42 may, if desired, then be wrapped around the underside of conductor 12, over anchor bar 36 and through the other of opening 38 or 40, before being tied off to add an extra element of stabilization to the connection between spacer 10 and conductors 12. By tying off fasteners 42 in the manner described hereinabove, a highly secure attachment is created between spacer 10 and conductor 12.

To further the non-conductive characteristics of spacer 10, fastener 42 is preferably composed of a plastic tie that is resistant to ultra-violet radiation. The plastic material will prohibit static discharge between fastener 42 and conductors 12, and use of an UV resistant material will prevent premature degradation of the fastener due to its constant exposure to the sun.

Although spacer 10 may be manufactured in any conventional manner, a preferred method of manufacture has been found to include forming an injection mold having the predetermined shape of insulator 16 and an opening to correspond to passageway 26. Rod 18 may then be passed through the mold's opening prior to injecting the material for insulator 16 into the mold. The insulator material may then be injected into the mold at a predetermined pressure, such as 20,000 PSI. The high pressure causes the material of insulator 16 to assume a solid shape and form a bond between itself and rod 18, thereby ensuring a secure connection between insulator 16 and rod 18. Either three molds can be simultaneously utilized to manufacture a complete spacer 10, or one mold can be used in three successive molding operations to form a complete spacer 10.

What is claimed is:

1. A spacer device for maintaining separation of a plurality of utility lines, comprising:
    a) a first insulator extending along a longitudinal axis and having a first conductor engaging portion;
    b) a second insulator longitudinally spaced from and extending co-axially with said first insulator, and having a second conductor engaging portion;
    c) a third insulator spaced from and extending co-linearly with said first and second insulators, and having a third conductor engaging portion;
    d) an elongated rod attached to and extending co-axially with each of said first, second, and third insulators; and
    e) said first, second, and third insulators further including first, second, and third body portions, respectively, extending co-linearly from said first, second, and third conductor engaging portions, respectively.

2. The spacer of claim 1, wherein said first, second, and third insulators are composed of a high density polyethylene.

3. The spacer of claim 1, wherein said first, second, and third insulators further include first, second, and third passageways, respectively, extending longitudinally therethrough.

4. The spacer of claim 3, wherein said rod extends through said first, second, and third passageways.

5. The spacer of claim 1, wherein said first, second, and third conductor retaining portions are each comprised of first, second, and third bars, respectively, extending parallel to said longitudinal axis, and a fourth bar extending transverse to said longitudinal axis.

6. The spacer of claim 5, wherein said first, second, and third bars each include a V-shaped notch cut out therefrom.

7. The spacer of claim 1, wherein said rod is composed of fiberglass.

8. A system for maintaining separation of a plurality of utility lines, comprising:
   a) a plurality of insulator members spaced along and extending co-axially about a longitudinal axis, each of said insulator members having a conductor engaging portion and a passageway extending longitudinally therethrough; and
   b) an interconnect member engaged with and extending co-axially with each of said insulator members.

9. The system of claim 8, wherein said conductor engaging portion further comprises first, second, and third bars, respectively, extending parallel to said longitudinal axis, and a fourth bar extending transverse to said longitudinal axis.

10. The system of claim 9, wherein said first, second, and third bars each include a V-shaped notch cut out therefrom.

11. The spacer of claim 8, wherein said interconnect member extends through said passageways.

12. The system of claim 8, wherein said insulator members are made from high density polyethylene.

13. The system of claim 8, wherein said interconnect member is a rod composed of fiberglass.

* * * * *